LINEAR ELECTRICAL COMPENSATION CIRCUITS

Filed Oct. 10, 1960 8 Sheets-Sheet 1

INVENTOR.
PETER R. PERINO
BY Philip Subkow
ATTORNEY

April 9, 1963 P. R. PERINO 3,085,193

LINEAR ELECTRICAL COMPENSATION CIRCUITS

Filed Oct. 10, 1960 8 Sheets-Sheet 2

INVENTOR.
PETER R. PERINO

BY Philip Subkow

ATTORNEY

INVENTOR.
PETER R. PERINO
BY Philip Subkow
ATTORNEYS

INVENTOR.
PETER R. PERINO
BY Philip Subkow
ATTORNEY

LINEAR ELECTRICAL COMPENSATION CIRCUITS

Filed Oct. 10, 1960 8 Sheets-Sheet 5

INVENTOR.
PETER R. PERINO
BY Philip Subkow
ATTORNEY.

April 9, 1963 P. R. PERINO 3,085,193

LINEAR ELECTRICAL COMPENSATION CIRCUITS

Filed Oct. 10, 1960 8 Sheets-Sheet 6

INVENTOR
PETER R. PERINO
BY Philip Sutkow
ATTORNEY

INVENTOR.
PETER R. PERINO
BY Philip Subkow
ATTORNEY

INVENTOR
PETER R. PERINO
BY [signature]
ATTORNEY

3,085,193
LINEAR ELECTRICAL COMPENSATION CIRCUITS

Peter R. Perino, Northridge, Calif., assignor to Statham Instrument, Inc., Los Angeles, Calif., a corporation of California Filed Oct. 10, 1960, Ser. No. 61,612
21 Claims. (Cl. 323—69)

Figure 1:
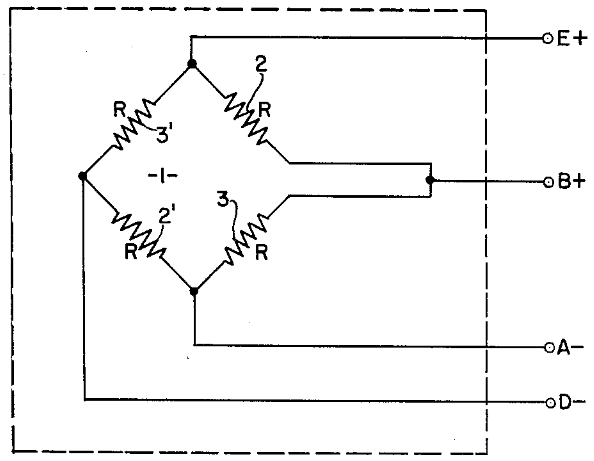

This invention relates to methods and circuits for compensating for zero drift of Wheatstone bridge circuits.

This invention relates generally to stabilization of the balance of Wheatstone bridge circuits against the effect of changes in temperature which cause bridge imbalance.

While I have found the most useful application of my invention to the compensation of Wheatstone bridges in which the impedance is changed due to some force, displacement or other condition to be sensed, it is generally applicable to any Wheatstone bridge whose bridge balance is subject to imbalance because of changes in impedance of the legs of the bridge resulting from changes in temperature. Such bridge impedances may be inductive. For example, they may be employed in transducers in which a condition to be sensed causes a change in the reluctance of the magnetic circuit of the inductances. The bridge imbalance caused by such change will result in a bridge output responsive to the condition. It also is applicable to capacitative types of Wheatstone bridges. For example, they may be employed in transducers in which the condition causes a change in the capacity which causes a bridge imbalance which is responsive to the condition.

While applicable generally as stated above, I have found one useful application to resistance type Wheatstone bridges. A particularly useful application is to the so-called strain gage transducers employing resistance elements whose resistance changes due to a strain imposed thereon by the condition to be sensed.

As is now generally known, the strain gages employing resistance elements, whose resistance changes as a result of some force or displacement imposed upon the transducers employing the same, are connected in bridge circuits in order to determine the magnitude of this change of resistance and, therefore, the magnitude of the force or displacement which is sensed by this change in resistance.

There are many examples of this type of strain gage. In the most widely used forms thereof, these resistance elements are in the form of filaments which may be either of the bonded type, that is, cemented to an element which is deformed, i.e., changed in shape or altered in length or width as a result of the force or displacement to be sensed, or are of the unbonded type now generally known as the Statham strain gages. Examples of such gages are those shown in the following patents.

In such strain gage transducers the filaments, which may be wires, foil or other strain-sensing elements whose resistance changes with the imposition of a stress thereon, are mounted upon the device so that the strain-sensitive elements are stressed and result in a change in resistances of such elements. Such strain-sensitive elements may be metallic filaments in the form of wires, as is conventionally used in the bonded or unbonded strain gages referred to above, or may also be filaments of the semi-conductive, piezo-resistive type, such as silicon, germanium, silenium, tellurium, arsenic, antimony, bismuth, copper and combinations thereof, which are piezo-resistive and have resistances which are intermediate metallic conductors and insulators.

Such strain-sensitive elements are connected in the Wheatstone bridge circuits to sense the changes in resistance. In some designs a sufficient number of elements are provided so they may form at least one arm, and preferably four arms, of the Wheatstone bridge. They are so compensated that when the transducer is subjected to no load, or displacement, the bridge is in balance; and when the transducer is subjected to some force or displacement, the strain-sensitive elements are differentially strained, so as to change their resistances, and the bridge is unbalanced to give an output potential across the bridge responsive to the force or displacement.

Without desiring to limit this invention to any form of transducer, the transducers described in the following patents illustrate forms of transducers which have strain-sensitive elements and in which the zero shift due to temperature variation may occur: U.S. Patent 2,600,701, U.S. Patent 2,778,624, U.S. Patent 2,622,176, U.S. Patent 2,453,549, and U.S. Patent 2,840,675.

This invention is not, however, limited to such transducers, but may be employed in all transducers in which a means whose impedance changes responsive to a force or displacement sensed by the transducer employing such means as the sensing means. Such means, when used as a sensing device in a transducer, and in which, due to the mechanical construction of such structures, the impedance elements in the Wheatstone bridge circuit employed to measure the force or displacement undergo changes due to differential expansion of the various parts of the transducers, as well as those which inhere in the materials employed in the impedances.

In some designs of transducer the strain-sensitive elements are thus strained in the same manner as if the transducer is subjected to load. This unbalance, due to temperature when no force or displacement is imposed on the transducer, i.e., when no load exists, is termed the thermal zero shift. This shift, in some designs, is fairly linear, so that the thermal zero shift is proportional to the temperature change. In such case it is possible to compensate for such thermal zero shift by introducing into one leg of the Wheatstone bridge a resistor whose resistance varies with temperature, so that it changes in amount and direction to cause an unbalance of the bridge opposite to and substantially equal in amount to the unbalance caused by the thermal zero shift. However, when this shift is not linear, as it is in some designs, the above compensation is not satisfactory.

I have designed an electrical circuit which can linearize a non-linear thermal zero shift and thereby improve the transducer characteristics, and may, in fact, so compensate the thermal zero shift as to produce substantially none and, ideally, no thermal zero shift; whereby a Wheatstone bridge circuit is obtained which, if balanced at one temperature, will remain balanced at higher and lower temperatures when no load or displacement is imposed upon the transducer containing the impedance elements connected into such Wheatstone bridge.

I have discovered that when a resistor having a negative coefficient is placed in parallel with a resistor having a positive coefficient, a non-linear resistance-versus-temperature curve is obtained. By proper selection of the resistor values and characteristics, a characteristic similar to, but opposite in sign to, the thermal zero shift of the transducer can be produced. By superimposing this circuit upon the Wheatstone bridge circuit having a thermal zero shift as described above, I may substantially reduce, and ideally cancel out, the thermal zero shift of the Wheatstone bridge, to produce a Wheatstone bridge circuit which has substantially no thermal zero shift.

This invention and preferred embodiments thereof will be further described by reference to the drawings, of which:

FIGS. 1 to 6*a* are schematic circuits illustrating my invention;

FIGS. 7–10*a* show curves illustrating my invention.

In FIG. 1, I illustrate a conventional balanced bridge circuit 1, composed of four legs of equal resistance, indicated by the letter "R." The legs connected to the positive pole of the D.C. input voltage and to the positive pole of the output voltage, for example, resistor 2 and its diagonally opposed resistor 2′, are termed positive legs and deemed to be of like polarity. The legs connected to the negative pole of the input voltage and to the positive pole of the output voltage, for example, 3 and its diagonally opposed resistor 3′, are termed to be negative legs and of like polarity. Legs which are of opposite polarity are termed adjacent legs. Thus, 2 and 2′ are each adjacent legs to 3 and 3′. Electrically the modification of a balanced Wheatstone bridge circuit by changing the resistance of one of the legs is the same as the modification caused by the same change in resistance of a diagonally opposed leg of the bridge. The input to the bridge is at E and A, with E being connected, for example, to the positive pole and A to the negative pole of the power source. The output corners of the bridge are shown at B and D, B being positive and D negative when E is positive and A is negative.

Figure 7:
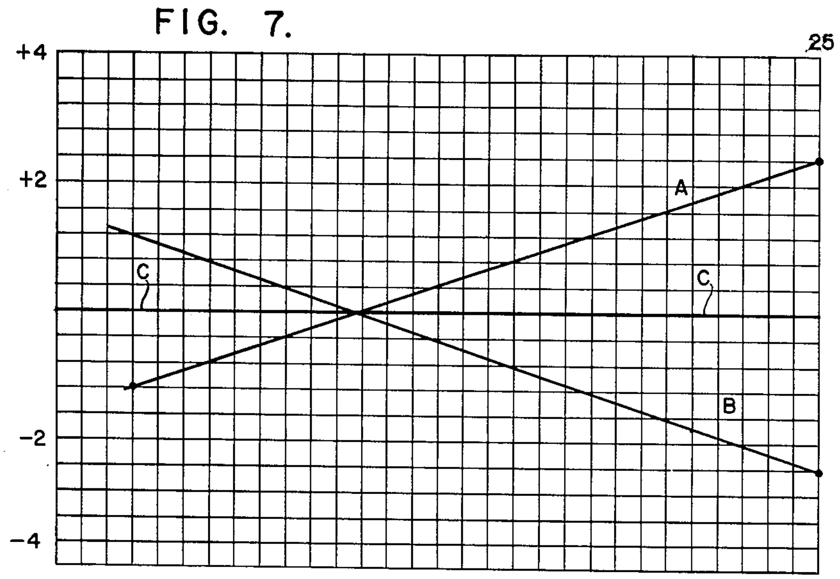

If such a bridge is placed in an enclosure, shown in dotted lines, where temperature may be regulated and is subjected to varying temperature, with the voltage input at E and A constant, the output of the bridge will be linear with temperature, as is illustrated by the line A on FIG. 7, in which the abscissas are in degrees Fahrenheit and the ordinates are voltage measurements at the output in relative values.

Since the voltage output increases with increase in temperature, such a thermal zero shift will be termed a positive thermal zero shift. This deviation may be compensated for, and the thermal zero shift of the bridge made substantially negligible and, ideally, zero, by introducing a resistance having a positive temperature coefficient of resistance, for example, one having a characteristic such as shown in curve A of FIG. 9. This resistance is introduced into the leg of the bridge, which would cause a voltage change which is of substantially equal magnitude but opposite in sign to the thermal zero shift illustrated by A of FIG. 7. Where the thermal zero shift is positive, as is illustrated by line A, the compensating resistor is placed in series with the resistance in the positive leg, i.e., a leg connected to the positive pole of the exciting voltage and the positive output pole or the leg diagonally opposite thereto, to wit, to the leg marked 2 or 2′. If the zero drift of the transducer is negative, i.e., becomes less positive and more negative as the temperature rises—thus, for example, one which is illustrated by line B of FIG. 7—the compensating resistor is placed in series with a negative leg, i.e., in series with the resistance in the leg connected to the negative pole of the input voltage and the negative output voltage pole, for example, the resistor marked 3 or 3′.

Figure 9:
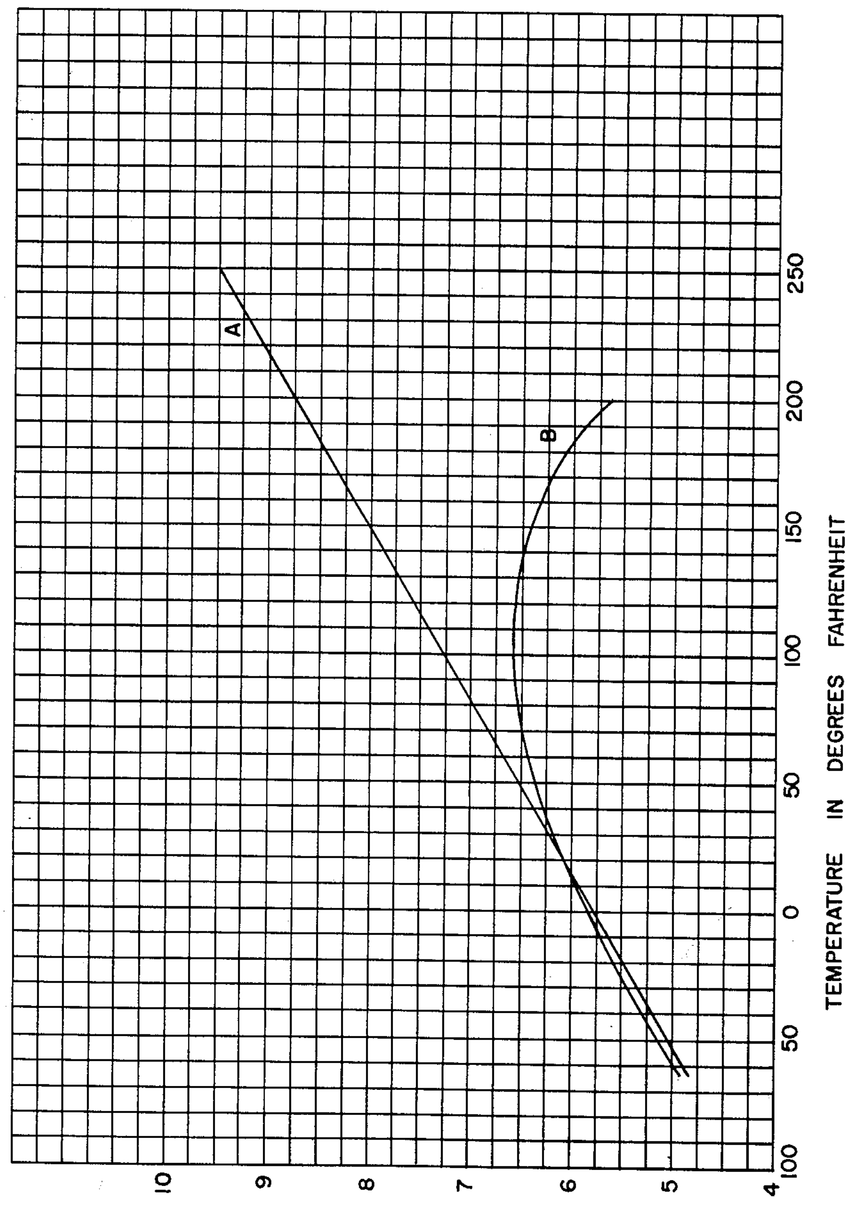

The magnitude of the resistance required for this compensation is given by the relation $$r = \frac{4Rb}{a}$$

where $r$ is the resistance of the compensating resistor at any temperature;

R is the resistance value of the four resistances R at the same temperature;

$b$ is the output voltage per degree per volt input, i.e., the slope of the line A or B, divided by the excitation voltage; and $a$ is the temperature coefficient of $r$, i.e., the slope of the line A of FIG. 9.

Figure 2:
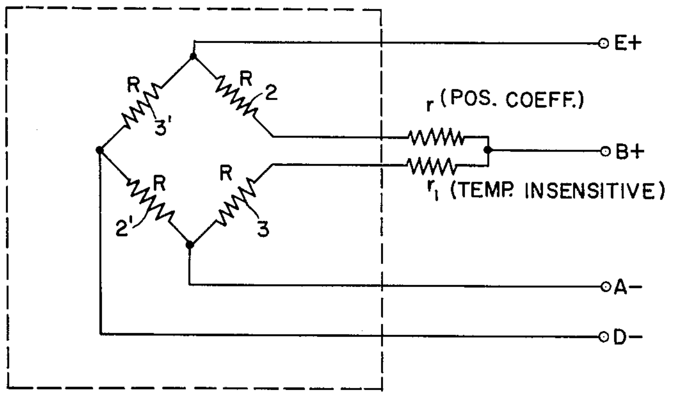
Figure 3:
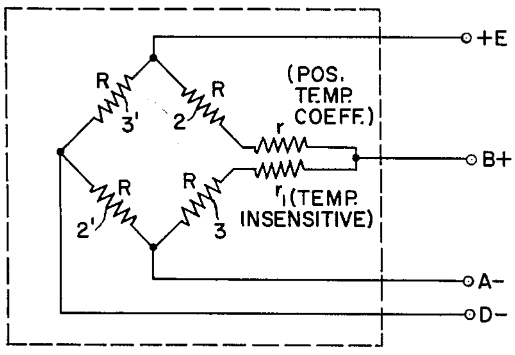

When such a resistor is placed in the circuit of FIG. 1 (see, for example, FIG. 2) and the bridge is placed within a zone of constant temperature (see dotted box of FIG. 2) with the resistance $r$ in a zone of variable temperature, and, assuming that the resistance is placed in the positive leg, as illustrated by FIG. 2, with the balancing temperautre insensitive resistor $r_1$ in the negative leg, the uncompensated bridge having the slope of line A of FIG. 7, and the resistance $r$ is subjected to various temperatures, the output of the bridge will follow line B. If the resistance $r$ is properly chosen, the slope of B will be equal and negative to the slope of A. When the bridge and the resistance $r$ and $r_1$ are both placed in the same temperature zone (see dotted box of FIG. 3), and the temperature is varied, the resistance $r$ compensates for the bridge resistances, and the two cancel so that the thermal zero shift is cancelled out and the output voltage follows line C—C of FIG. 7, to wit, there is no thermal zero shift.

If the result of the measurements of FIG. 1 indicated a thermal zero shift according to line B, and the resistance $r$ had been placed in the negative leg in FIG. 2, the slope of the compensating resistor would have followed line A. When this system is employed in the scheme of FIG. 3, the compensation would also occur to give line C—C.

In all of the above circuits, in order to maintain the bridge in balance, a balancing resistor $r_1$ is introduced into the leg adjacent to that in which resistor $r$ is introduced, in order to maintain the bridge in electrical balance. The resistance $r_1$ is ideally chosen to have a resistance which does not change with temperature.

The above conditions illustrate the method of compensation for transducers which show a positive or negative linear deviation, i.e., in which the thermal zero shift is proportional to temperature, to give lines such as A or B of FIG. 7. However, for many transducers, the deviation is not linear. For example, they may have a nonlinear zero shift characteristic such as shown in curve A′ of FIG. 8, when tested as in the experiment illustrated by FIG. 1. The introduction of the resistance $r$ and $r_1$, as in FIG. 2, would, when it is tested as in FIG. 3, cause the curve A′ to be rotated: for example, to the position of the curve A of FIG. 8. Such a thermal zero shift as shown by curve A′ is termed a positive non-linear thermal zero shift; and the non-linear thermal zero shift illustrated by curve A I term a rotated thermal zero shift.

Figure 8:
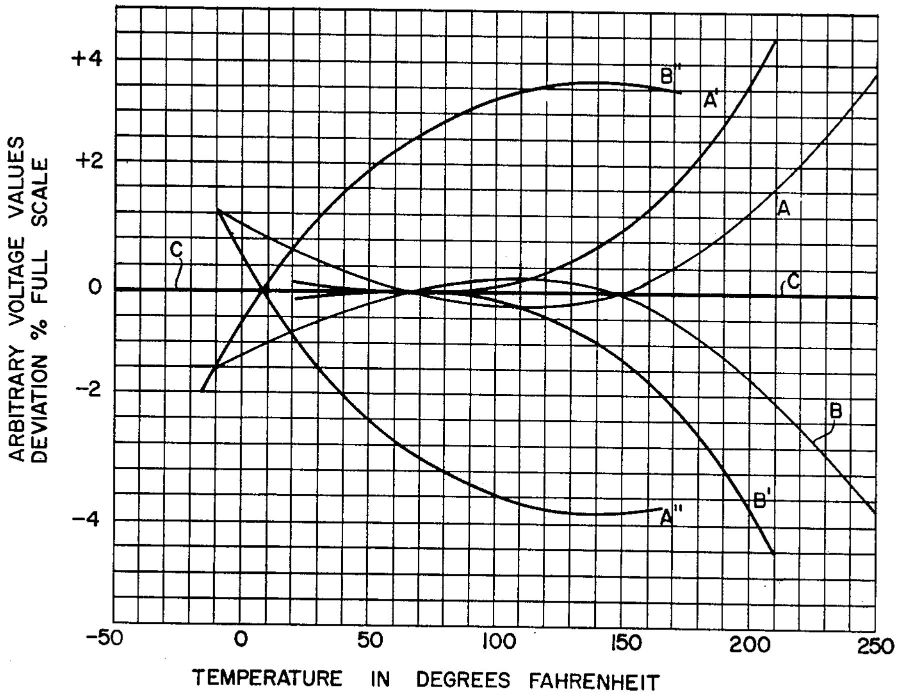

In other types the non-linear thermal zero shift is negative; for example, one such is illustrated by the curve B′ of FIG. 8. In such case a resistance placed in the negative leg will rotate the curve to give, for example, a rotated thermal zero shift curve such as B of FIG. 8. But in both cases this thermal zero shift is not removed and is still not linear.

I have now devised an additional compensation circuit which reduces and, ideally, completely removes the thermal zero shift, so that the bridge under no load or displacement conditions of the transducer remains in balance with no voltage across the output corners of the bridge over wide ranges in temperature. Thus, for example, where the thermal zero shift is a rotated positive zero shift, such as illustrated by curve A of FIG. 8, i.e., where the compensating resistance is in the positive leg of the bridge (see FIG. 4), I introduce a second compensating circuit in the negative leg, composed of a resistance 4 having a positive temperature coefficient of resistance in parallel with the resistance 5, having a negative coefficient of resistance; and, if desired, I may, as will be more fully described below, add a further parallel resistance 6, whose resistance is substantially constant with changes in temperature. Where the parallel resistances balance $r$, no other temperature insensitive resistors $r_1$ need be employed. If the parallel resistor is insufficient for bridge balance, such resistance is placed in the negative or positive leg as is required, as will be understood by those skilled in this art.

Where the original thermal zero shift was negative and has been rotated by resistance $r$ in the negative leg of the bridge, I place the resistance $r$ in a negative leg and the parallel resistors 4, 5 and 6 in a positive leg (see FIG. 4a), using also additional resistances $r_1$ as described above, understanding the polarity of the legs to apply equally to diagonal legs of the bridge. By a proper choice of the resistances and their temperature coefficients, I may make the compensation in both cases such that the zero shift will be along the line C—C of FIG. 8, to wit, that there will be substantially no zero shift.

This I accomplish by making the temperature characteristics of the parallel resistance network to have a temperature characteristic which is the negative in value to the temperature characteristic of the nonlinear thermal zero shift of the uncompensated transducer employing the resistance $r$ and $r_1$. Thus, where the temperature characteristics of the compensated bridge, using the resistances $r$ and $r_1$, but not using the resistances 4, 5 and 6 (see FIG. 3), shows the characteristics illustrated by curve A of FIG. 8, I make the temperature characteristics of the resistances of 4, 5 and 6 to follow that of the curve B. In like manner, when the non-linear thermal zero shift is illustrated, for example, by curve B, I make the temperature characteristics of the parallel resistance network to be one which is illustrated by curve A. The effects illustrated by curve A cancel the effects illustrated by curve B, resulting in a thermal zero shift unsubstantial in magnitude and, ideally, of zero value, as illustrated by the line C—C of FIG. 8.

Figure 4:
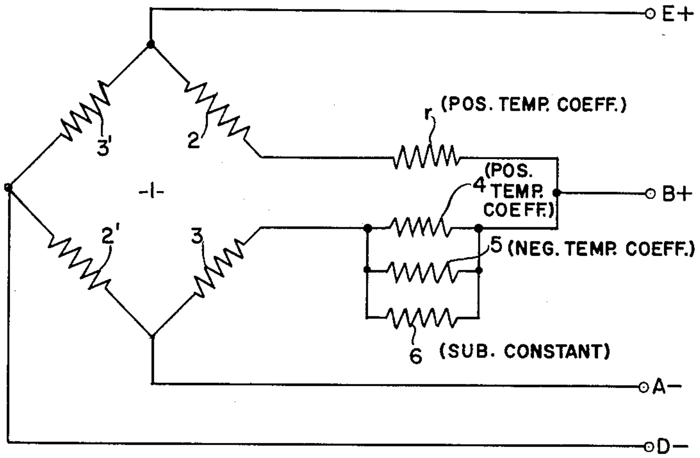
Figure 4A:
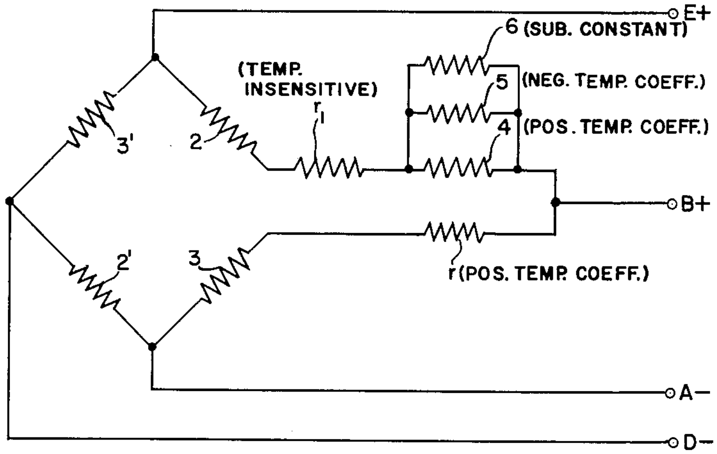
Figure 4B:
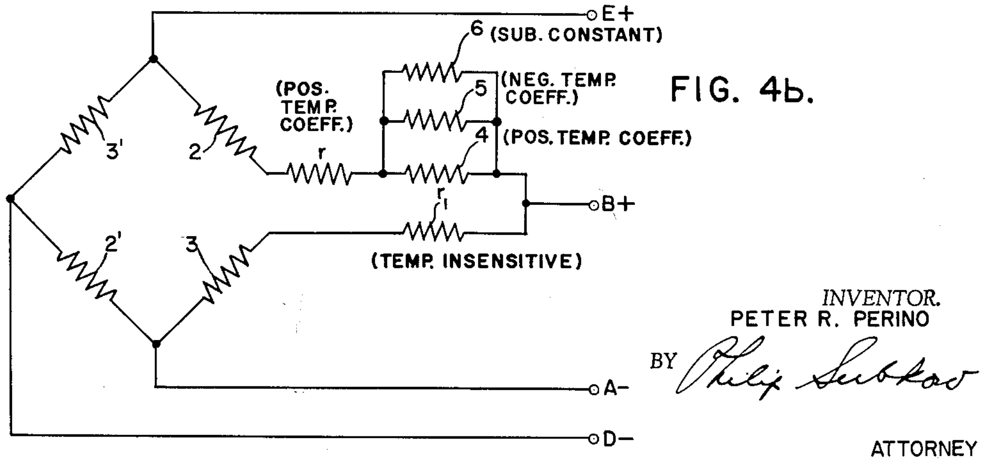

Other forms of non-linear thermal zero shifts are illustrated by curve B″ of FIG. 8, which is another form of positive thermal zero shift. By employing $r$ in the positive leg, as illustrated in FIG. 2, if the resistance $r$ is of sufficient magnitude, the curve may be rotated to the position of curve B to give a negative non-linear thermal zero shift. Such a system may be compensated in the same way as was the system which produced curve B as the rotated zero shift previously described, by introducing into a positive leg the compensating circuit of resistors 4 and 5 of FIG. 4, in series with resistance $r$, as is shown in FIG. 4*b*.

Figure 4D:
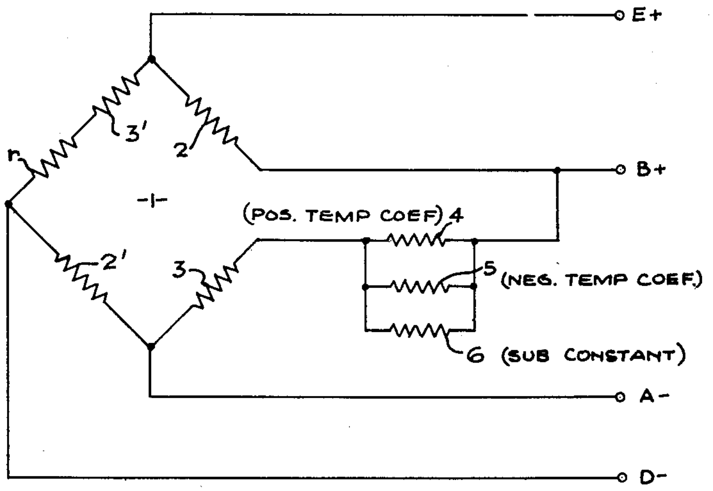
Figure 4C:
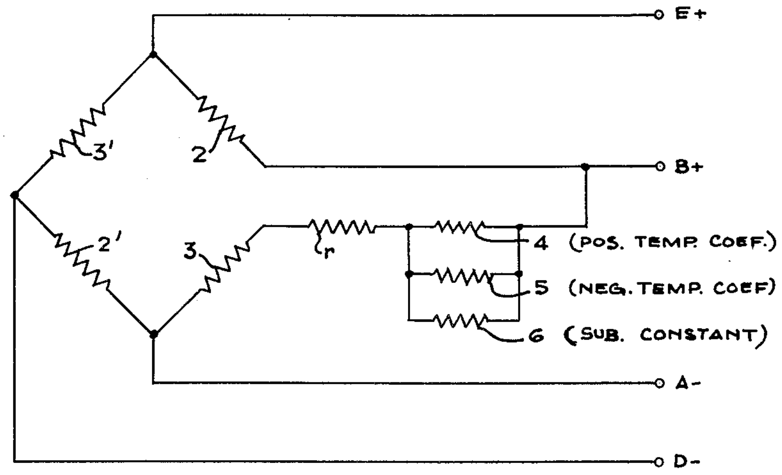

A fourth form of non-linear thermal zero shift is that illustrated by A″, which is another form of negative thermal zero shift. By employing a resistor $r$ in a negative leg which is of sufficient resistance, curve A″ may be rotated to the position of curve A to give a positive non-linear thermal zero shift. Such a system may be compensated in the same way as was the system which produced curve A as the rotated zero shift previously described, by introducing into a negative leg the compensatory circuits 4, 5 and 6, if necessary, of FIG. 4, in series with resistance $r$.

Where $r$ is employed together with the compensatory parallel resistor circuit, the parallel resistor may be placed in series with the resistance $r$ or in the diagonally opposite leg of the bridge, as will be understood by those skilled in this art from the above. Thus, where the resistor $r$ and the compensatory parallel resistors circuit are to be both placed in the negative leg, they may be in series in the same leg as shown in FIG. 4*c* or one in one leg and the other in the diagonally opposite leg of the same polarity as shown in FIG. 4*d*.

Figure 5:
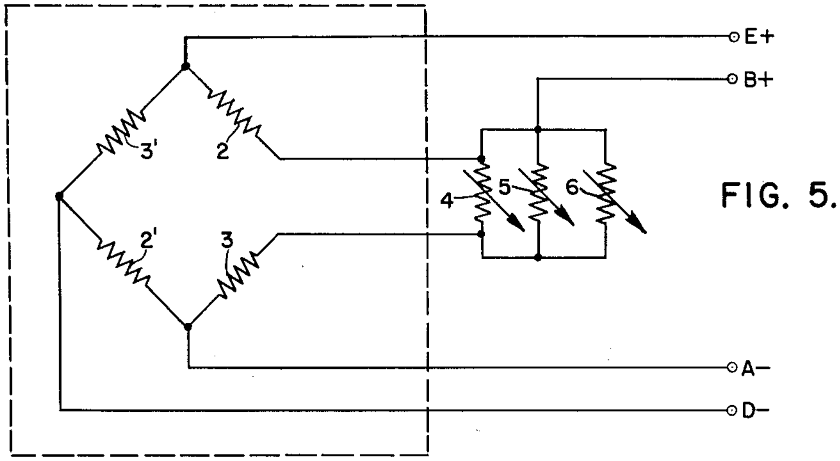
Figure 10:
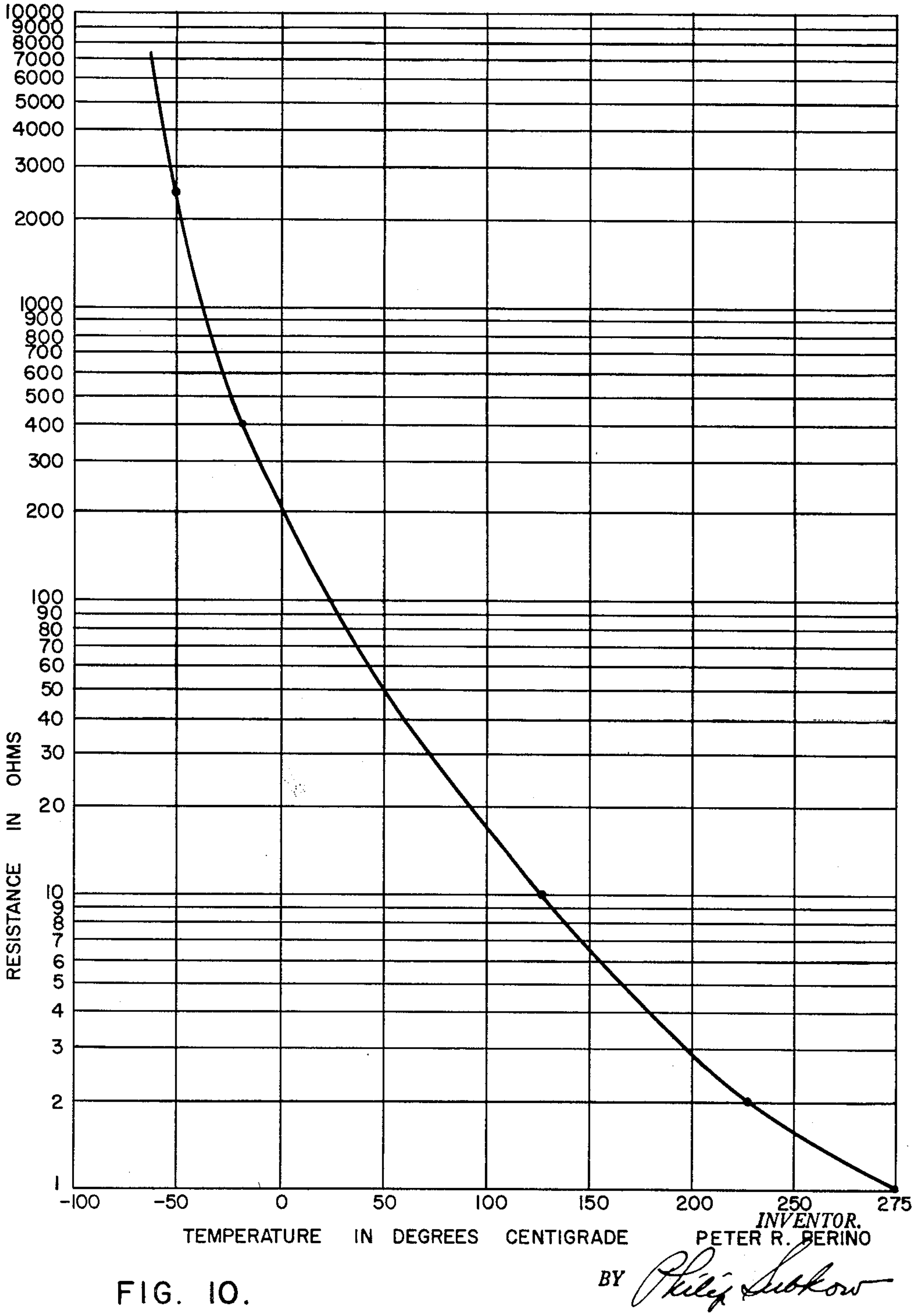
Figure 11:
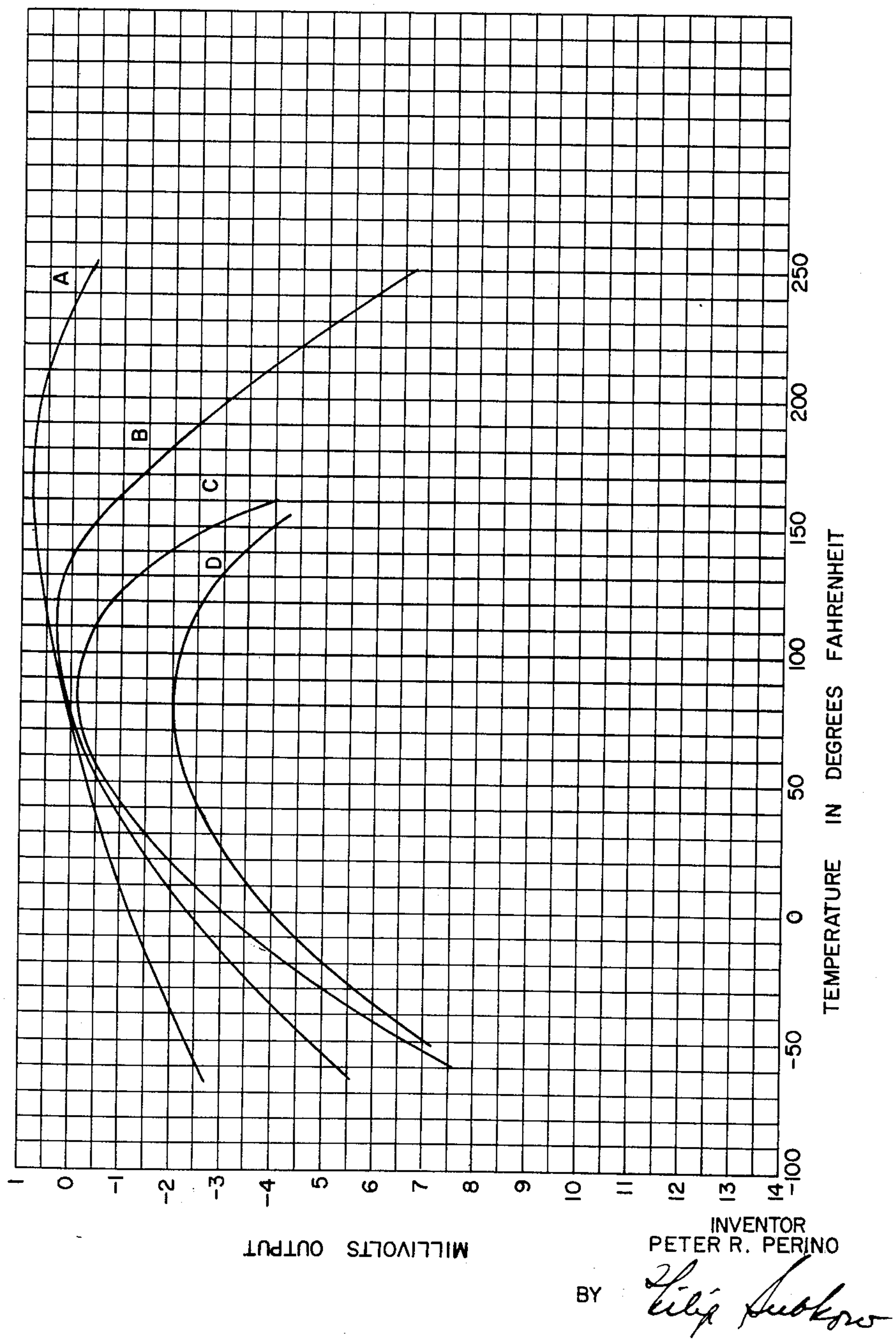

The effect of the parallel positive and negative coefficient resistors is illustrated by curves of FIGS. 9, 10. For example, as stated previously, line A of FIG. 9 illustrates one example of a resistor having a positive coefficient of resistance. The curve of FIG. 10 illustrates one example of a negative coefficient resistor, also termed a thermistor. The particular example of curve A, FIG. 9, is one sold under the trade name Balco by W. B. Driver Company, understood to be composed of 70% nickel and 30% iron. Example of FIG. 10 is sold by Victory Engineering Corp. and is understood to be a ceramic-like semi-conductor. When these two resistances are placed in parallel and subjected to various temperatures, a curve such as curve B of FIG. 9 is obtained. Such a curve may be mathematically or experimentally determined from the curves of FIG. 10 and curve A of FIG. 9. The system of FIG. 5 illustrates one experimental determination. The dummy bridge composed of fixed resistors 2, 2′, 3 and 3′ is placed in a constant temperature zone 7. The resistance 4, with a positive temperature coefficient of resistance, and resistor 5, of negative temperature coefficient of resistance, are employed, but resistance 11 is not employed. These resistances are subjected to varying temperatures, and the output is determined, keeping the input constant. For example, assuming a fixed input voltage as the ambient temperatures surrounding resistors 9 and 10 are raised, the output may, for example, follow the curve A of FIG. 11. By increasing the resistance of the resistance 4 to necessarily higher values, the output curve is made progressively of greater curvature, and the maximum of the curve is shifted to lower temperatures (see, for example, curves B and C).

A further modification of the curvature of curves such as A, B and C is made possible by introducing the additional resistance 6, whose resistance does not change with temperature. The resultant flattening of the curve without shift of the maximum is illustrated by curves C and D.

Thus, by selecting the resistances to have the desired temperature coefficients of resistance and the proper values of their resistances at the same temperature, I may obtain a compensation curve for the resistance network composed of resistances 4, 5, and 6, if necessary, of FIGS. 4, 4*a*, 4*b* and 5, to produce the compensation described above.

Figure 6:
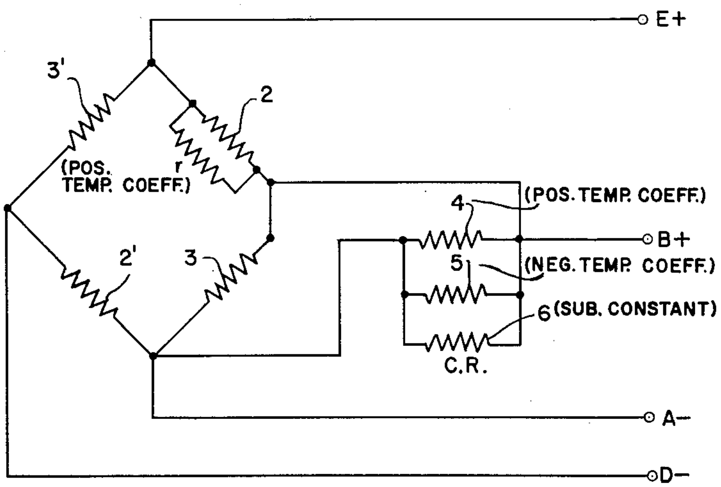

In the previous description the resistor $r$, having a positive temperature coefficient of resistance, has been placed in series with one of the legs of the bridge. The effect of this resistor is to make the leg resistance vary in direction to increase the resistance with increases in temperature. A similar effect may be obtained by placing the resistance $r$ in parallel with the said leg instead of in series therewith. In such case the temperature compensating parallel circuit is placed in parallel with the adjacent leg of the bridge. Here, again, the same effect is obtained when the resistance with positive coefficient of resistance is placed in parallel with either one of the diagonally positioned legs of the bridge or the parallel circuit is placed parallel with an adjacent leg or in the leg which is diagonally opposed to the adjacent leg. This is illustrated by FIG. 6. Thus, the resistor $r$ of FIG. 4 is placed in parallel with resistor 2 or 2′; the resistor network 4, 5 and 6 is placed in parallel with resistor 3 or 3′. In like case, if $r$ is in parallel with 3 or 3′, the parallel network is in the adjacent legs 2 or 2′. If the network of resistors 4, 5 and 6 does not produce a zero balance, an additional temperature insensitive resistor is introduced in series with the parallel network of 5, 6 and 7 or in series with $r$, depending on the direction of unbalance.

Thus, FIG. 6 illustrates a system in which the uncompensated initial thermal zero shift is in one direction, i.e., as illustrated by curve A′ or B′. If the initial thermal zero shift is of the opposite, i.e., B′ or A′, the position of $r$ and the parallel network 4, 5 and 6 is reversed.

Figure 6A:
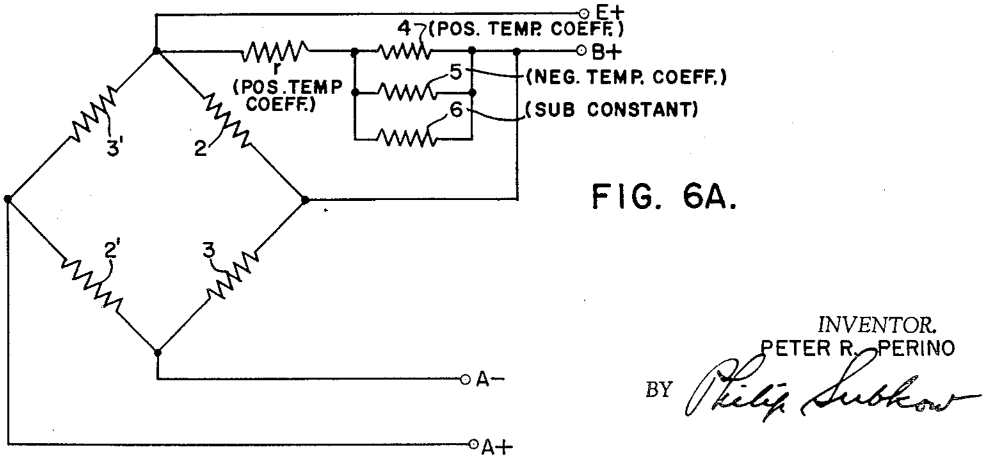

If the uncompensated thermal zero shift is of the form illustrated by A″ or B″, then the $r$ and the parallel network will be series as is illustrated in FIG. 6A. If the sign of the thermal zero shift is opposite in sign, then the series, parallel network is placed in parallel with the leg adjacent, i.e., in parallel with 3 or 3′ of FIG. 6A.

As stated above, the above effects will be obtained from the use of the resistor $r$ or the parallel resistors and the parallel network by placing them in the legs diagonally opposed to the ones illustrated in the drawings of FIGS. 6 and 6A. Thus, $r$ may be in parallel with 2 or 2′, and the parallel network in parallel with 3 or 3′; or, if $r$ is in parallel with 3 or 3′, the parallel network may be placed in parallel with 2 or 2′, all with like effect.

While I have described a particular embodiment of my invention for the purpose of illustration, it should be understood that various modifications and adaptations thereof may be made within the spirit of the invention, as set forth in the appended claims.

I claim:

1. A balanced compensated Wheatstone bridge circuit comprising four impedance legs, a resistor having a positive temperature coefficient of resistance electrically connected to one of said legs to modify the impedance of said one leg and a separate parallel resistance circuit electrically connected to one of said legs to modify the impedance of said last-named one leg, said parallel resistance circuit comprising in parallel a resistor having a positive temperature coefficient of resistance and a resistor having a negative temperature coefficient of resistance.

2. A balanced compensated Wheatstone bridge circuit comprising four impedance legs, a resistor having a positive temperature coefficient of resistance electrically connected to one of said legs to modify the impedance of said one leg, a separate parallel resistance circuit electrically connected to another of said legs to modify the impedance of said last-named other leg, said parallel resistance circuit comprising in parallel a resistor having a positive temperature coefficient of resistance and a resistor having a negative temperature coefficient of resistance.

3. A balanced compensated Wheatstone bridge circuit comprising four impedance legs, a resistor having a positive temperature coefficient of resistance electrically connected to one of said legs to modify the impedance of said one leg, a separate parallel resistance circuit electrically connected to a leg of like polarity as said one of said legs, said parallel resistance circuit comprising in parallel a resistor having a positive temperature coefficient of resistance and a resistor having a negative temperature coefficient of resistance.

4. A balanced compensated Wheatstone bridge circuit comprising four impedance legs, a resistor having a positive temperature coefficient of resistance electrically connected to one of said legs to modify the impedance of said one leg, a separate parallel resistance circuit electrically connected to an adjacent leg to modify the impedance of said adjacent leg, said parallel resistance circuit comprising in parallel a resistor having a positive temperature coefficient of resistance and a resistor having a negative temperature coefficient of resistance.

5. A compensated Wheatstone bridge circuit comprising four impedance legs, a resistor having a positive temperature coefficient of resistance electrically connected in series with one of said legs to modify the impedance of said one leg, a separate parallel resistance network electrically connected in series with one of said legs to modify the impedance of said last-named one of said legs, said parallel resistance network comprising in parallel a resistor having a positive temperature coefficient of resistance and a resistor having a negative temperature coefficient of resistance.

6. A compensated Wheatstone bridge circuit comprising four impedance legs, a resistance having a positive temperature coefficient of resistance electrically connected in series to one of said legs and a separate parallel resistance network connected in series to said first mentioned resistance, said parallel network comprising in parallel a resistor having a positive temperature coefficient of resistance and a resistor having a negative temperature coefficient of resistance.

7. A compensated Wheatstone bridge circuit comprising four impedance legs, a resistance having a positive temperature coefficient of resistance electrically connected to one of said legs to modify the resistance of said one leg, a separate parallel resistance network electrically connected in series to a leg diagonally opposed to said leg connected to said positive temperature coefficient of resistance, said parallel network comprising in parallel a resistor having a positive temperature coefficient of resistance and a resistor having a negative temperature coefficient of resistance.

8. A compensated Wheatstone bridge circuit comprising four impedance legs, a resistance having a positive temperature coefficient of resistance electrically connected to one of said legs to modify the resistance of said one leg, a separate parallel resistance network electrically connected in series with a leg adjacent to said leg connected in series to said positive temperature coefficient of resistance, said parallel resistance network comprising a resistance having a negative temperature coefficient of resistance and a resistance having a positive temperature coefficient of resistance.

9. A compensated Wheatstone bridge circuit comprising four impedance legs, a resistance having a positive temperature coefficient of resistance connected in parallel with one of said legs, a parallel resistance network connected in series with said first mentioned resistance having a positive temperature coefficient of resistance, said parallel resistance network comprising in parallel a resistance having a negative temperature coefficient of resistance and a resistance having a positive temperature coefficient of resistance.

10. A compensated Wheatstone bridge circuit comprising four impedance legs, a resistance having positive temperature coefficient of resistance electrically connected in parallel with one of said legs, a parallel resistance network connected in series with said first-mentioned resistor of positive temperature coefficient of resistance, said parallel network comprising a resistor having a negative temperature coefficient of resistance and a resistor having a positive temperature coefficient of resistance.

11. A compensated Wheatstone bridge circuit comprising four impedance legs, a resistance having a positive temperature coefficient of resistance electrically connected in parallel with one of said legs, a parallel resistance network connected in parallel with the leg adjacent to said leg connected in parallel with said resistor having a positive temperature coefficient of resistance, said parallel network comprising in parallel a resistance having a negative temperature coefficient of resistance and a resistor having a positive temperature coefficient of resistance.

12. A balanced compensated Wheatstone bridge circuit comprising four impedance legs, said bridge having a thermal zero shift, a compensating resistance network electrically connected to said bridge to modify the resistance of said bridge and to compensate for temperature unbalance of said bridge, said network having a temperature coefficient of resistance similar to but opposite in sign to the thermal zero shift of said bridge, said network comprising a resistor having a positive temperature coefficient of resistance parallel with a resistor having a negative temperature coefficient of resistance.

13. In the circuit of claim 12, a resistance whose resistance does not change substantially with temperature in series with said parallel network.

14. In the network of claim 12, a resistance having a positive temperature coefficient of resistance in series with said parallel network.

15. In the circuit of claim 12 in which said parallel network has a resistance whose resistance does not change substantially with temperature in parallel with the resistors of said parallel network.

16. A balanced compensated Wheatstone bridge circuit comprising four impedance legs, input and output connections to said bridge, a parallel resistance network electrically connected to one of said legs to modify the impedance of said one leg, said parallel resistance network comprising in parallel a resistor having a positive temperature coefficient of resistance and a resistor having a negative temperature coefficient of resistance.

17. In the circuit of claim 16, said parallel resistance network being also in series with the output of said bridge.

18. In the circuit of claim 16, said parallel resistance network being connected in series to said one leg.

19. In the circuit of claim 18, said parallel resistance network being in series with the output of said bridge.

20. In the circuit of claim 16, said parallel resistance network being electrically connected in parallel with said one leg.

21. In the circuit of claim 20, said parallel resistance network being electrically connected in series to the output of said bridge.

No references cited.